United States Patent [19]

Deckert et al.

[11] 3,746,068

[45] July 17, 1973

[54] FASTENERS AND SEALANTS USEFUL THEREFOR

[75] Inventors: Fred W. Deckert, Waunakee, Wis.; Gale W. Matson, Minneapolis, Minn.

[73] Assignee: Minnesota Mining and Manufacturing Company, St. Paul, Minn.

[22] Filed: Aug. 27, 1971

[21] Appl. No.: 175,458

Related U.S. Application Data

[60] Division of Ser. No. 887,398, Dec. 22, 1969, Continuation-in-part of Ser. No. 638,428, May 15, 1967, abandoned.

[52] U.S. Cl. .......... 151/14.5, 117/100 C

[51] Int. Cl. .......... F16b 39/00

[58] Field of Search .......... 151/41.7, 14.5; 117/100 C; 85/1 C

[56] References Cited

UNITED STATES PATENTS

| | | | |
|---|---|---|---|
| 3,485,132 | 12/1969 | Hanny et al. | 85/1 C |
| 3,467,544 | 9/1969 | Maninelli | 117/100 C |
| 3,179,143 | 4/1965 | Schultz et al. | 151/41.7 |
| 3,516,941 | 6/1970 | Matson | 117/100 C |

*Primary Examiner*—Edward C. Allen
*Attorney*—Kinney, Alexander, Sell, Steldt & Delahunt

[57] ABSTRACT

Mechanical fasteners and stable pressure-activatable adhesive system therefor based on encapsulated resin, preferably epoxy and non-volatile curative therefor, preferably an amine such as 1, 3-bis-4-piperidylpropane or imidazole, the capsules and curative being contained in polar solvent-free binder which can hold system on abutment surfaces of fastener.

3 Claims, 1 Drawing Figure

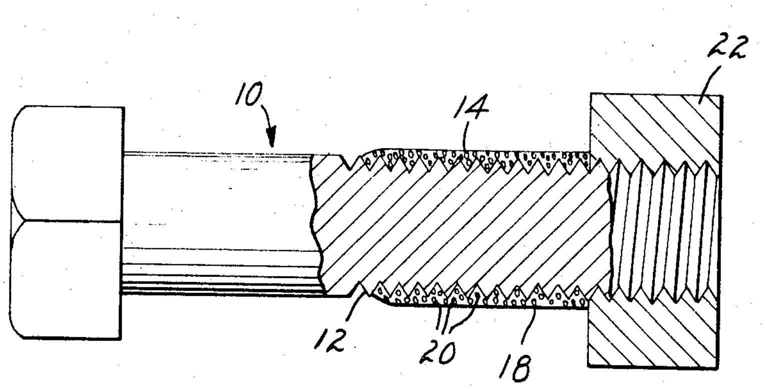
INVENTORS
GALE W. MATSON
FRED W DECKERT
BY Kinney, Alexander,
Sell, Steldt & DeLaHunt
ATTORNEYS

FASTENERS AND SEALANTS USEFUL THEREFOR

This is a division of application Ser. No. 877,398 filed Dec. 22, 1969, which is a continuation-in-part of Ser. No. 638,428, filed May 15, 1967, now abandoned.

This invention relates to improved self-locking fastening devices, particularly employing threaded mechanical fasteners such as bolts, screws, nuts, pipe joints, threaded nails, and the like, and to novel stable latent curing adhesive cements suitable for use in conjunction therewith.

Various fastening devices have been proposed or used utilizing adhesives or plastics in one way or another in attempting to prevent the fasteners from loosening during use or service. Ideally, such a fastener-locking system should be capable of easy manufacture or assemblage by the fastener manufacture. It should be tackfree and non-blocking so that many fasteners can be shipped and stored in barrels or other containers without adhering to each other or being tacky to the touch, so as to be difficult to handle or gather dust. The adhesive applied to the fastener should have long term stability both before and after application so that both the adhesive and the coated fasteners may be handled and stored in accordance with conventional procedures without degrading the adhesive. In use, the fastening device should be capable of being readily applied without undue increase in the amount of work or input torque necessary to install the fastener. The adhesive should cure rapidly so that the fastener may be used after only a short cure period and provide a bond, such that substantially increased work or back-off torque is required to remove the fastener. Desirably, also, such a system should be capable of reuse after removal of the fastener, and the adhesive should provide some latent curing which would enable a fastener which has slightly loosened, due to vibration or other stresses, to become refastened rather than dropping out of place.

Insofar as we are aware, however, no one prior to the present invention has provided any commercially practical self-locking fastener having these features. Fastener systems which have been available suffer from one or more drawbacks.

One fastener sealing adhesive system in present commercial use involves an anaerobically curable adhesive which is applied to the fastener in liquid form immediately before the fastener is to be installed. The adhesive cures after installation of the fastener due to the absence of oxygen between the abutment surfaces of the fastener and other surfaces which they contact. Such systems suffer from the disadvantage that they must be applied by the ultimate user of the fasteners, rather than by the fastener manufacturer. Moreover, once the cure is completed, it is no longer possible for refastening to occur if the fastener is slightly loosened in service.

Another commercially used fastening means involves the application of a slug of deformable material, such as a nylon plastic, in a cavity on the fastener surface; for example, in the threaded area. Such devices do provide an increased prevailing torque if the fastener is slightly loosened, but in addition to being costly, suffer from the disadvantage that more work is normally required to install the fastener than to remove it.

A further system involves two separated strips of coreactants applied to the threads of a bolt. This system requires two separate applications of the adhesive materials, and generally a further application of a protective polymer coating. The bolts cannot easily be shipped in contact with others because of the likelihood of contact and premature reaction of the coreactants due to contact of resin on one bolt with curing agent on another.

Another system which has been proposed is that described in Schultz et al. U. S. Pat. No. 3,179,143, granted Apr. 20, 1965, which system is a latent curing single-component adhesive coated on the abutment surfaces of threaded fastening devices. Co-reactants which together form the adhesive are separated from each other by encapsulation in microscopically small capsules which rupture upon the application of pressure to mix the co-reactants thus activating the adhesive. Prior to the present invention, systems of the type disclosed in the Schultz et al patent have suffered from a lack of stability not hitherto fully understood. Apparently the commercially used capsules, formed from aminoplast polymers, are not entirely impervious especially after long term storage in contact with many amine epoxy curatives. These amines, especially in the presence of moisture, appear to swell or otherwise attack the capsule walls, causing premature cure of the adhesive with resultant loss of adhesive locking strength.

A number of interrelated shortcomings impair the performance of previous formulations especially after extended shelf storage. Amines such as aminoethyl piperazine disclosed in the Schultz et al. patent, which are capable of curing epoxy resins at room temperature apparently volatilize and escape from the adhesive over too short a storage period to be commercially acceptable. Other less volatile amines, such as dicyandiamide either will not cure the resin at room temperature or are immiscible with the resin when released from the capsules; thus the adhesive does not cure rapidly, if at all, at room temperature. The more volatile amines apparently vaporize and escape, even when covered by a coating of a material such as methyl cellulose.

The water-based, hydroscopic methyl cellulose binder apparently in itself causes instability due to its tendency to pick up moisture from the surroundings. Instability due to water is unexpected since the capsules are manufactured in an aqueous slurry and are found stable in the presence of moisture in other applications. Unknown forces, perhaps the water in combination with an amine curative, apparently cause the instability which is overcome in accordance with the present invention.

The present invention provides a significant advance over the structures described in the Schultz et al patent and other prior art in that it provides novel self-locking fasteners (and the latent curable adhesives for use therein) which permit the use of known capsules for containing an adhesive co-reactant, which yet have the commercially required stability and capability of withstanding prolonged storage and handling. Insofar as we are aware, this invention provides the first self-locking fasteners, coated with an adhesive system, capable of being stored for many months in drums, barrels or crates, shipped in commerce, and then used by simply turning a mating element such as a nut into place to form a bond which requires significantly greater force to loosen the bond than is required to tighten the fastener into place. The bonds formed are sufficient to withstand substantial vibration encountered in industrial machinery, automobiles, or refrigerators.

The adhesive system, prior to application to the fastener can be shipped in commerce and stored for weeks or months without premature cure and can then be applied to fasteners and then further stored for extended periods at ambient temperatures (which normally fluctuate widely), and cured at room temperatures upon physical rupture of the microcapsules. If desired, cure can also be accelerated by the application of heat to the composition, but room temperature cures are ordinarily preferred for convenience of application. The adhesives of this invention can be applied to fasteners in one single coating process and can be applied to any abutment surfaces of the fastener, to which sufficient pressure is applied to cause rupture of the capsules on application of the fastener. The threads of a threaded mechanical fastener are preferred because both compressive and shearing forces can be applied to the adhesive to insure rupture of the capsules and mixing of the co-reactants.

In accordance with the present invention, it has been discovered that certain preferred combinations of curing agents and binders can be utilized together with aminoplast polymer capsules to provide stable ostensibly one-part adhesives which are not only non-tacky, but which are also stable in humid atmospheres. These adhesives contain a curing agent which is readily miscible with the resin used, and which will rapidly cure the resin at ordinary room temperatures. Adhesives of this invention may be applied to fasteners and stored for at least twelve months, and generally much longer, under normal conditions without any significant loss of adhesive properties. The adhesives of this invention can be applied to the abutment surfaces of a fastener, or to other surfaces to be joined to which sufficient pressure or shear forces can be applied to effect rupture of the capsules. The adhesive is activated at room temperatures by application of pressure and/or shearing forces thereto, for example, upon tightening of the fastener. Other applications include plates or articles which are joined together under great pressure, preferably with simultaneous application of frictional shearing forces, to the surfaces being bonded. The improved adhesive systems of this invention are substantially free of water and other polar solvents and contain essentially non-hygroscopic ingredients including encapsulated resin, a substantially non-volatile curing agent which is miscible with said resin, and an organic polymeric binder for said resin and curing agent. Since the adhesive systems of this invention are substantially water-free (desirably containing less than one percent water by weight of adhesive composition), fasteners coated therewith have less tendency to corrode than do those coated with water-based systems.

The improved self-locking fasteners of this invention are formed by applying the improved adhesives to the abutment surfaces thereof especially to the threaded portion of a threaded mechanical fastener such as the threads of a nut or bolt. Such fasteners are generally formed from a rigid structural material such as metal, wood, glass, ceramic, or a plastic such as nylon or polyvinyl chloride, and may include bolts, screws, nuts, pipe fittings, etc. Other mechanical fasteners to which the improved adhesives may be applied include dowels, nails, rivets and staples, in which case the adhesive is applied to the shank and/or under the head, etc. of the fastener. The adhesive formulations can be applied to the fasteners by dipping, spraying, strip application of molten material extruded on the fastener, roll application, or other techniques which will be apparent to those skilled in the art.

The invention will be further illustrated by the accompanying drawing, wherein the FIGURE is an enlarged cross-sectional view of a fastener illustrating one embodiment of the invention.

Bolt 10 is coated, preferably on threads 12, with adhesive 14. Adhesive 14 preferably consists of a matrix portion which is a polymeric binder 18 having distributed therein capsules 20 (shown greatly enlarged) which contain a curable resin. A curing agent for the resin is also distributed throughout the binder matrix. As nut 22, or equivalent mating threaded device, is run onto bolt 10, some of capsules 20 are ruptured by the shearing forces produced. The shearing forces caused by running nut 22 onto bolt 10 also effect thorough mixing of the resin released from the capsules with the curing agent, thus promoting rapid thorough cure of the released resin. Capsules not ruptured by the first use of the fastener can be ruptured, for example, due to vibration. Thus, the fasteners of this invention are both re-useable, and capable of refastening themselves if slightly loosened in use.

The preferred resins are liquid 1,2-epoxy resins, contained within microscopically small capsules which range in size from 5 to 500 microns, and preferably 25 to 150 microns. Examples of the preferred epoxy resins include 1,2-epoxy reaction products of polyhydric phenols such as bisphenol-A and epichlorohydrin or polyglycidyl ether, epichlorohydrin with phenolformaldehyde condensation polymers and epichlorohydrin with amine phenols.

The preferred polyepoxides contain an average of more than 1 and generally more than an average of about 1.5 oxirane groups per molecule. Examples of the preferred resins are liquid polyglycidyl ethers of bisphenol-A which have slightly less than two oxirane groups per average molecular weight (for example, Epon 815, or ERL-2795). Examples of resins having more than 2 oxirane groups per average molecular weight are polyglycidyl ethers of phenol-formaldehyde novolaks (for example, D.E.N. 438, which has a functionality of 3.6, or the trifunctional novolak Epiphen E.R. 823). When highly viscous resins such as the latter, or even solid resins are used, for example, in order to provide some desired property such as temperature resistance, etc., it is preferred to form a blend with a less viscous resin such as ERL-2795. Further suitable resins include polyglycidyl ethers obtained from the reaction of dihydric or polyhydric alcohols with epichlorohydrin, for example, resins made by condensing epichlorohydrin and glycerin to give di- and tri-epoxides having a functionality of about 2.2 (e.g., Epon 182) and polyglycol polyepoxides such as the diglycidyl ether of polypropylene oxide (e.g., D.E.R. 736). Further examples will be apparent to those skilled in the art.

For the preferred epoxy resin systems, it has been found that there are several important characteristics for the curing agent used. Firstly, in order to be useful, the curing agent should cure the resin to a tough infusible state within about 24 hours at room temperature. Preferred curatives, however, produce a significant amount of cure within a shorter time, within a few minutes up to about 6 hours. Also, it is important that the curative be substantially non-volatile and capable of being stored at 120°F. exposed to the atmosphere for at least about 1 week without losing more than 2 percent of its weight. Curatives having this characteristic have been found to be useful in forming adhesives having long term storage stability on bolts or other fasteners at ambient temperatures. Preferably the curative should not lose more than 2 percent weight when a 2.0 gram sample is heated in an open vessel in a non-circulating oven heated to 136°F. (temperature fluctuation being controlled to within ±2°) for 12 days.

A third and very important characteristic is that the amine must have at least about 50 or more atomic weight units per amine group. Amines having a higher functionality than this (i.e., less than about 50 molecular weight units per amine group), while often being good room temperature curatives, have been found to produce instability, apparently by attacking the walls of capsules formed from condensation polymers such as urea-formaldehyde.

The substantially non-volatile curing agent may be in either solid or liquid form so long as it is miscible with the resin used, i.e., will rapidly dissolve when mixed with the resin. The miscibility of the amine in the resin can be determined by means of a simple "spatula" test by placing resin in a container and mixing in a chemically equivalent amount of the amine while stirring slightly with a spatula. Amines which are sufficiently miscible in the resin will convert the resin to a hard infusible solid within about 18 hours. Other useful amines will dissolve in significant amounts and cause an increase in viscosity within this time period, but may require as much as 7 days to reach a hard resin stage. The latter curatives can be used in cases where the longer cure times are not a problem. If the amine is not sufficiently miscible with the resin, cure will not occur and two discontinuous phases may be present in the container.

Examples of suitable substantially non-volatile amine during agents for polyepoxide resins are: imidazole, 1,3-bis-4-piperidyl propane, 1,6-hexane diamine, 4,4'-methylenedianiline, substituted alkylene diamines and liquid polyamide resins such as Versamid 125 (a dimerized unsaturated fatty acid reacted with alkylene diamines). It will be understood that curing agents which are in themselves volatile can sometimes be converted by chemical reaction to a substantially non-volatile form. For example, liquid amines can be reacted with acids to form solid amine salts having reduced vapor pressure. For example, the tetraethylene pentamine can be reacted with a fatty acid to give a salt useful as a curing agent.

The preferred amine curing agents for polyepoxide resins are strongly basic amines which in saturated solution in water will have a pH value of at least about 9.5. Amines more weakly basic than this tend to provide a cure rate for the adhesive less than the optimum. The curing agent is generally added in approximately a stoichiometric amount. However, those skilled in the art will recognize that lesser amounts can be used in the case of curatives which have a catalytic curing effect on the resin.

The binder resin used to bind together the capsules and curing agent should be an organophilic, hydrophobic water insoluble organic polymeric material capable of being stably dispersed in solvents which have a solubility parameter of less than 9 (as discussed below) and a hydrogen bonding strength of poor to medium (i.e., which are free or substantially free of highly polar functional groups such as hydroxy, amino, amido, and carboxylic groups), the binder material further being capable of forming a self-sustaining film when cast from said solvents. Adhesives of the invention which contain these binder resins will, on curing or drying of any solvent therefrom, result in a solid non-tacky coating at room temperature on the fastener to which the adhesive composition is applied. Preferred binder resins of this invention are organophilic hydrophobic water insoluble polymers which are soluble to at least about 6 weight percent in toluene at 70°F.

The binder is added to the adhesive composition in amounts sufficient to bind the other ingredients in the adhesive together without crumbling or peeling away from the fastener surface. Generally somewhat larger amounts of binder resin are necessary in the case of liquid curing agents in order to provide a formulation which will dry to a solid substantially tack-free state. Examples of suitable binder materials include butadiene-styrene copolymers, either of the GRS or stereospecific block copolymer type, butadiene-acrylonitrile copolymers, polyvinyl butyral polymers, butyl rubbers, solid polyamid resins, toluene-soluble polyurethane resins, polychloroprene polymers, soluble copolymers of ethylene and propylene, polystyrenes, soluble polyvinyl chloride polymers and copolymers, low acid number hydrocarbon resins, such as asphalt, and blends of such materials.

In one preferred embodiment of the invention, the binder resin is dissolved in a solvent therefor and the capsules and curing agent are mixed therein. This mixture can then be applied to bolts or other fasteners by dipping, brushing, spraying, etc., and the mixture dries to a tack-free film upon evaporation of the solvent. The solvents used should have low polarity, aromatic solvents such as toluene and benzene, which are free of hydroxyl and amino functional groups, being preferred. Polar solvents, particularly water and alcohols, should be avoided in order to avoid damage to the capsule shells and/or premature reaction with the curative. Useful solvents have been found to have a solubility parameter of about 9 or less, and a hydrogen bonding capability of from medium to poor. Numerous solvents are listed and discussed according to solubility parameters and hydrogen bonding capability, in "Polymer Handbook," Interscience Publisher, 1966, at pages 341 – 358.

In another embodiment of the invention, the binding resin is in the form of a relatively low temperature melting material. The adhesive composition is formed by melting the resin and mixing in the capsules and curing agent. The adhesive-containing mixture is then handled in a solid form, commonly referred to as a "hot melt." This "hot melt" formulation is applied to the fastener by melting and applying to the abutment surfaces of the fastener, or may simply be applied by rubbing the formulation over a fastener, particularly the threaded portion thereof. The "hot melt" type formulations provide cost and safety advantages in that the use of the volatile solvent, which is usually lost on volatilization, and which may cause odor and fire hazards, is eliminated.

In a still further embodiment of the invention, the adhesive can be formed into a flexible film. Such films can be formed by using a polymeric binder which is a rubbery film-forming material containing the capsules and curing agent, and casting the same onto a flat surface in the form of either a molten or solvent-containing liquid, and hardening either by cooling or evaporating the solvent. Films thus formed can be stamped into washers which can then be applied to fasteners in the usual manner, or the film may be used as a thread wrapping means. In the latter applications, the film is simply wrapped around the threads before application of the mating threaded part, which causes rupture of the capsules due to the combined pressures and shearing forces. Such films can be wound and supplied in the form of a tape.

Whatever the form the adhesive takes, in the interest of maximum storage life, it should be exxentially water-free, preferably containing no more than about one percent by weight of total adhesive composition. If necessary, all the ingredients can be dried, e.g., by moderate heating or using drying agents, prior to formulation of the adhesive.

The invention will be further illustrated by means of the accompanying examples in which all parts are given by weight unless otherwise indicated.

EXAMPLE I

A urea-formaldehyde resin pre-polymer solution was prepared by reacting an agitated mixture of 38.8 lb. (17.6 kg) 37 percent Formalin, 0.188 (85.2 gm) triethanolamine, 14.5 lb. (6.56 kg) urea for 2 hours at 70°C. (158°F.). After this reaction period the resulting solution was diluted with 178 lb. (80.8 kg) cold water.

The encapsulation of ERL 2795 epoxy resin, a bisphenol-epichlorohydrin reaction product was carried out in a 50 gallon reactor having the dimensions of 34 inches h. × 22½ inches d. with 4 inches baffles 2 inches wide fitted with a 4 inches flat blade turbine agitator 8 inches from the tank bottom as follows: The prepolymer solution above was adjusted to a pH of 7.0 with 160 ml 3N hydrochloric acid at 22.2°C. (72°F.) after which was added 60 lb. (27.2 kg) ERL-2795. The agitation speed was adjusted to 1,230 rpm and agitation continued for 34 minutes to insure equilibrium mixing prior to initiating the encapsulation reaction. The acid catalyzed polymerization reaction leading to formation of deposited shell walls of urea-formaldehyde resin was catalyzed by adding 448 ml 3N hydrochloric acid at a rate of 40 ml per minute to a pH value of 2.2. The reaction was maintained at 23.3°C. (74°F.) for 1 hour after the pH was reduced to 2.2 at which time the temperature was increased to 40°C. (104°F.). The encapsulated epoxy resin product was recovered after overnight reaction by neutralizing (pH=7) with 27.5 percent sodium hydroxide, filtration and water washing of the slurry and drying in a forced air oven at 120°F. The capsule size range was 25–75 $\mu$.

8.0 gm of polyvinyl butyral resin were dissolved in 92 gm of toluene which had been heated to 140° to 150°F. 32 gm of 1,3-bis-4-piperidyl propane, an amine having 105 atomic weight units per amine group, was added to this hot solution, and the resulting mixture was agitated for 2 hours until the amine had completely dissolved. The mixture was then cooled to room temperature (75°F.) and 80 gm of the capsules (containing about 60 gm of epoxy resin) were then added, and the resulting mixture agitated until the capsules were well distributed through the solution. After standing for approximately 48 hours, the capsules had settled to the bottom of the container, but could be redistributed by agitation.

The adhesive was tested by dipping a ½ inch diameter, 13 threads to the inch, 1 inch long, hex head cap scres, into the adhesive, threads first, lifting the bolt out, and allowing the adhesive to dry on the threads. The amount of dry adhesive was usually from 0.3 to 0.45 gm. After 24 hours at room temperature, and 2 hours at 160°F., the toluene solvent had evaporated, leaving a non-tacky film of the adhesive on the threads of the bolts. The adhesive was tested by mating an appropriated sized nut to the bolt and running the bolt into the nut with 30 ft. lbs. (416 kg-cm) of run in torque. After 24 hours, the break-loose torque was measured, with a torque wrench, and if prevailing torque was measured, the same measurement was made by recording the amount of torque required to move the bolt out of the nut after ½ and 1 full revolution from break-loose. Typical values were 50, 48 ft. lbs. (692, 664 kg-cm) for break-loose torque and 28–32 (388–444 kg-cm) for prevailing torque. Values for nuts and bolts without adhesive were 21 ft. lbs. (291 kg-cm) for break-loose torque and 0 for prevailing torque. The treated bolts of the present example demonstrated a similar increase in break-loose torque after being stored for 52 weeks before being used. The adhesive bond after being formed also remains essentially stable after more than one year.

Tests were also conducted with ⅜ × 1¼ inches Grade 5 cap screws with matching nuts. All metal parts were degreased with acetone and dried before adhesive application. The bolts were dipped into the adhesive so that sufficient threads were covered to engage the nut with two threads exposed on the backside of the nut.

On these ⅜ inch screws, the adhesive covered about 0.85 inch of the threads. Excess adhesive was permitted to drain from the screws for about 10 seconds, then any additional excess material was scraped onto the edge of the can containing the liquid adhesive. Solvent removal was effected by letting the screws stand upright on the head for 24 hours at room temperature, then for 2 hours at 160°F. in an oven. After this treatment, about 0.18 to 0.20 gram of adhesive containing approximately 1 percent solvent was left on the threads of the screw. This constituted sufficient excess so that adhesive was extruded from the mating surfaces when the screw was tested.

Ability of the adhesive to provide bonds after re-use was tested on these bolts using a procedure simulating actual use. A hardened steel washer was placed between the head of the bolt and a mild steel plate which had a hole drilled for insertion of the bolt. A second hardened steel washer was placed under the nut on the exposed side of the bolt and the nut was tightened to 31 ft. lbs. seating torque with at least two threads exposed outside of the nut. A 24 hour cure time at room temperature was used before the break-loose torques were measured. The bolts were reseated immediately after making the complete measurement for each cycle. Results are shown in Table I. The break-loose torque of this assembly without adhesive was 25 ft. lbs. Each of the figures given is the average of eight test samples. Similar assemblies were also tested by exposure to gasoline, oil, and water immersion, outdoor exposure, and salt spray, for one month. The adhesive in each case withstood the exposure without significant loss of adhesive properties.

TABLE I

| Reuse | (pit) pre-[1] vailing in torque ft. lbs.(kg-cm) | (st) seat-[2] ing torque ft.lbs. (kg-cm) | (blt) break-loose torque ft.lbs. (kg-cm) | (pot) pre-[3] vailing out torque ft. lbs.(kg-cm) |
|---|---|---|---|---|
| Initial | 0.5 (7) | 31 (429) | 40 (553) | 9 (124) |
| 1st | 6.5 (90) | 31 (429) | 32 (443) | 6 (83) |
| 2nd | 2.8 (37) | 31 (429) | 27 (373) | 3 (41) |
| 3rd | 1.5 (21) | 31 (429) | 25 (346) | 2 (28) |
| 4th | 1.0 (14) | 31 (429) | 23 (318) | .4 (6) |

(1) Prevailing in torque increases as the nut is screwed on until all of the threads are engaged. This value is then a maximum until the screw is seated and is the reported value.

(2) Seating torque commercially recommended for Grade 5, 3/8 inch screws to give a fastener tension between 60 and 70% of the ultimate yield strength of the fastener material.

(3) Prevailing out torque was an average value taken at the end of the first revolution out during steady, even removal of the bolt.

It has also been found that the stability of the adhesive for long term storage can be improved by drying the capsules at elevated temperatures of 200° to 350°F. It has also been found preferable to use $H_2SO_4$ in place of HCl and $Na_2SO_4$ in place of NaCl in the capsule making procedure. Melamine can also be substituted for about 8 percent (on an equivalent weight basis) of the urea in order to bring about a further improvement in the capsule stability. These improved capsules, which are the subject of another patent application, enable the use of a wider variety of curatives than possible with capsules previously known. The capsules can also be treated with a solution of an alcohol such as furfuryl alcohol immediately before drying. This latter treatment apparently has the effect of chemically "tying up" any amine-reactive chemical groups in the capsule shell walls, and makes the capsules more readily dispersible in organic solvents and binders.

EXAMPLE I-A

To the adhesive mixture of Example I was added 8.4 grams of a micron-sized synthetic silica filler ("Syloid 244"), with sufficient agitation to provide a uniform mixture. The advantages derived from such filler are two-fold. First, after prolonged standing, e.g., for several months to a year, only slight agitation is required to redistribute the settled ingredients into a uniform system, while the mixture of Example I after storage may require considerable agitation to effect redistribution. Second, the strength of the adhesive is improved at elevated temperatures. Thus, break-loose torque tests were conducted in ⅜ × 1¼ inch Grade 5 cap screws with matching nuts as described in Example I. Fully cured assemblies were heated to 250°F. and tested for break-loose torque at this temperature. An average value of 28 ft. lbs. (388 kg-cm) was obtained with the filled adhesive of this example compared to an average value of 18 ft. lbs. (250 kg-cm) obtained with the composition of Example I under the same conditions of testing. Other performance values are similar to those obtained and listed in Example I. Useful results are achieved when the filler is present in the amount of about 2 – 20 grams (on the basis of Example I amounts), with about 6 – 12 grams constituting a preferred range.

EXAMPLE II

A mixture of 15.0 gm of Versamid B-710, a polyamide resin made from a long chain aliphatic dibasic acid and a polyamine having a softening temperature of about 150°F. and an amine number of less than 100, with 20.0 gm of 1,3-bis-4-piperidyl propane, was heated to 200°F., at which temperature the mixture was a viscous solution. 40 gm of the capsules of Example I were stirred into the mixture to give a viscous paste, with a viscosity at 200° of about 120,000 centipoise. This paste did not change in viscosity at this temperature for 48 hours. This hot paste was applied to the threads of a clean, dry bolt, along one side of the threads as a stripe, approximately one-fourth inch wide. The Versamid B-710 served as a binder for the reactive ingredients. A nut was threaded onto this bolt, and torqued in with 30 ft. lbs. (416 kg-cm) of applied pressure and allowed to stand 24 hours before measuring the break-loose torque. Break-loose torques of 52 (720 kg-cm), 54 (748 kg-cm), 52 (720 kg-cm), and 57 (790 kg-cm) were measured for four bolts coated and treated in the described fashion. The paste when cooled to room temperature hardened into a somewhat waxy solid which could be applied to fasteners by rubbing on at room temperature or remelted and applied.

EXAMPLE III

A solution A was made by dissolving 25 parts by weight of a butadiene-styrene block stereospecific copolymer in 75 parts by weight toluene. A second solution B was made by dissolving 50 parts by weight of Staybelite Ester No. 10, a hydrogenated wood resin, in 50 parts by weight toluene. A third solution C was made by dissolving 5 parts by weight Hycar 1072 (a butadiene-acrylonitrile copolymer containing some free carboxyl groups) in 95 parts by weight toluene. Solution A (15 parts) was blended with B (2.5 parts) and C (50 parts). After the mixture was thoroughly blended, 5.13 parts of 1,3-bis-4-piperidyl propane was dissolved in the mixture and 11.25 parts of capsules (70 percent fill, 10 to 120 $\mu$ diameter) were stirred in until the resulting material was a homogeneous dispersion. The dispersion was coated out on a silicone release paper with a blade of approximately 20 mils thickness, to give a viscous coating on the surface of the release coating paper. After evaporation of the solvent, a film was obtained which could be stripped readily from the release paper. This film had an elongation of over 100 percent and the strength of the film was low. When wrapped on the threads of a ½ inch bolt, and a nut applied, and torqued down to 30 ft. lbs. (416 kg-cm), after 24 hours, an average of 55 ft. lbs (762 kg-cm) was required to break the nut away from the bolt. Washers could also be cut from the film and used as locking means.

EXAMPLE IV

A mixture of 16.0 grams of imidazole, 40 grams of the capsules of Example I, and 50 grams of 8 percent polyvinyl butyral in toluene was prepared. This mixture was thoroughly blended and then applied to the threads of one-half inch 13, 1 inch long hexagonal head cap screws. After a 24 hour drying period at room temperature the solvent content was reduced to 30 percent. The bolts were then fitted with nuts which were tightened to 30 ft. lbs. (416 kg-cm) of applied torque. After 2½ days cure at room temperature, the break-loose torque was measured and found to be 51 (707 kg-cm), 55 (762 kg-cm), 58 (804 kg-cm), and 58 (804 kg-cm) ft. lbs. The average prevailing torque to maintain the removal of the nut was 15 (208 kg-cm) to 20 (267 kg-cm) ft. lbs. Imidazole has 66 atomic weight units per amine group.

EXAMPLE V

An adhesive formulation was prepared by mixing 16.0 grams of 4,4'-methylenedianiline, 40.0 grams of the capsules of Example I, and 50.0 grams of 8 percent poluvinyl butyral in toluene. This mixture (after being thoroughly blended) was also applied to the threads of ½ inch cap screws as in Example IV. The break-loose torque was measured at the end of a 2½ day room temperature cure. The break-loose torques were measured and found to be 54 (749 kg-cm), 60 (831 kg-cm), 52 (721 kg-cm), and 58 (804 kg-cm) ft. lbs. Average prevailing torque was 30 (416 kg-cm) ft. lbs. on this first removal of the nut.

EXAMPLE VI

Example I was repeated, substituting different binders for the polyvinyl butyral resin. The proportions of ingredients used are listed in Table II as are the values obtained by applying the adhesive under the head of a ½ inch bolt of the type as described in Example I, putting the adhesive in place, and allowing the adhesive to cure.

Some of the bolts with the adhesive thereon were aged at 120°F. These bolts were then turned into place and allowed to cure. The foot pounds of torque required to remove the latter bolts are also recorded in Table II. The numbers given in parentheses indicate the time in weeks in which the bolts were aged at 120°F.

EXAMPLE VII

Adhesive formulations were prepared using the capsules of Example I with a liquid polyamid resin (Versamid 125) as the curing agent. The liquid polyamid capsule mixture was made solid and non-tacky by the addition thereto of appropriate polymeric binders. The amounts of capsules, binder, and curing agent are listed in Table III. The values for break-loose torque obtained by applying the adhesive formulation to the underside of the heads of ½ inch bolts of the type described in Example I, tightening the bolts in place, and allowing the adhesive to cure, are also given in Table III. Some of the bolts with the adhesive thereon were aged at 120°F. before being tightened into place. The values obtained for back-off torque after this amount of aging are also given in Table III. Versamid 125 has over 200 atomic weight units per amine group.

TABLE II

| Sample number | Binder | Parts binder | Capsules, parts | 1,3-bis-4-piperidyl propane | Break-loose torque, ft. lbs. (kg.-cm.) Initial | Break-loose torque, ft. lbs. (kg.-cm.) Aged adhesive (aged 3 wks.) |
|---|---|---|---|---|---|---|
| A | 25% butadiene styrene block copolymer in toluene | 10.6 | 64 | 24.4 | 35 (485) | 27 (374) |
| B | 25% low molecular weight butadiene styrene block copolymer in toluene | 10.6 | 65 | 24.6 | 38 (374) | 27 (374) |

TABLE III

| Sample number | Binder | Parts binder | Capsules, parts | Curing agent, parts | Break-loose torque, ft. lbs. (kg.-cm.) Initial | Break-loose torque, ft. lbs. (kg.-cm.) Aged, 3-5 wks |
|---|---|---|---|---|---|---|
| A | 25% butadiene-styrene block copolymer in toluene | 17 | 47.4 | 34.5 | 37 (514) | 32 (444) |
| B | 25% low molecular weight butadiene-styrene block copolymer in toluene | 10 | 52.5 | 37.5 | 32 (444) | 25 (348) |
| C | 10% GR-S type butadiene-styrene copolymer in toluene | 4 | 56 | 40 | 38 (528) | 26 (361) |
| D | 10% polyvinyl butyral in toluene | 7.6 | 54 | 38.4 | 36 (500) | 32 (444) |
| E | 20% isobutylene rubber (GR-I) in toluene | 5.9 | 54.9 | 38.2 | 38 (528) | 30 (416) |

What is claimed is:

1. A mechanical fastener having coated on the abutment surfaces thereof a stable non-tacky solid locking cement, said fastener being characterized in that it is pressure-activatable and self-curing at ambient temperatures to give a firmly adherent bond and comprising microscopically small capsules having infusible aminoplast polymer shells, containing therewithin a liquid polyepoxide resin, said capsules being rupturable upon application of pressure during the positioning of said fastener into place, and a room temperature solid low volatility amine curing agent for said polyepoxide resin in an amount sufficient to cure said resin, said amine curing agent being capable of undergoing storage at 120°F. under exposure to the atmosphere for at least one week without loss of more than 2 percent thereof due to vaporization, said amine having at least about 50 atomic weight units per amine group, said microcapsules and said curing agent being homogeneously dispersed within an organophilic non-hygroscopic film-forming organic polymeric binder, said binder being stably dispersible in solvents which are substantially free of highly polar functional groups and which have a solubility parameter of less than about nine, said cement containing less than about 1 percent water.

2. A fastener according to claim 1 wherein said amine is 1,3-di-4-piperidylpropane.

3. A fastener according to claim 1 wherein said amine is imidazole.

* * * * *

UNITED STATES PATENT OFFICE
CERTIFICATE OF CORRECTION

Patent No. 3,746,068 Dated July 17, 1973

Inventor(s) Fred W. Deckert and Gale W. Matson

It is certified that error appears in the above-identified patent and that said Letters Patent are hereby corrected as shown below:

Column 14,

--4. A mechanical fastener according to claim 1 in which said abutment surfaces comprise a threaded portion of said fastener.--

Signed and sealed this 20th day of November 1973.

(SEAL)
Attest:

EDWARD M.FLETCHER,JR.
Attesting Officer

RENE D. TEGTMEYER
Acting Commissioner of Patents